United States Patent [19]

McNabney

[11] 4,197,740

[45] Apr. 15, 1980

[54] FLUID FLOW MEASURING APPARATUS

[75] Inventor: John C. McNabney, Verona, Wis.

[73] Assignee: Wehr Corporation, Milwaukee, Wis.

[21] Appl. No.: 940,585

[22] Filed: Sep. 8, 1978

[51] Int. Cl.² ............................................. G01F 1/46
[52] U.S. Cl. ................................................... 73/212
[58] Field of Search ................... 73/205 R, 211, 212, 73/213

[56] References Cited

U.S. PATENT DOCUMENTS

| | | | |
|---|---|---|---|
| 2,842,962 | 7/1958 | Dall | 73/213 |
| 3,667,494 | 6/1972 | Haase | 73/213 |
| 3,765,241 | 10/1973 | Lambert | 73/212 |
| 3,895,531 | 7/1975 | Lambert | 73/212 |

*Primary Examiner*—Herbert Goldstein
*Attorney, Agent, or Firm*—Michael, Best & Friedrich

[57] ABSTRACT

A fluid flow sensor for measuring the conditions of pressure and/or velocity of fluid flow in a passage and which has the capability of averaging measured pressure and/or velocity of flow across the width of the passage.

6 Claims, 2 Drawing Figures

FLUID FLOW MEASURING APPARATUS

BACKGROUND OF THE INVENTION

The invention relates to fluid flow sensors and to arrangements for measuring the condition of pressure and/or velocity of the flow of a fluid in a passage and to accomplishing a control function on the basis of those conditions. More particularly, the invention is related to such apparatus having the capability to average the measured pressure and velocity of fluid flow across the width of a fluid flow duct such that air flow distribution within the duct is not critical to the functioning of a sensor.

Fluid flow measuring arrangements are illustrated in the following patents:
U.S. Pat. No. 1,087,929; Dodge; 2-24-14
U.S. Pat. No. 3,751,982; Lambert; 8-14-73
U.S. Pat. No. 1,311,798; Bristol; 7-29-19
U.S. Pat. No. 2,441,042; Stoll; 5-4-48
U.S. Pat. No. 3,273,390; Brown; 9-20-66
U.S. Pat. No. 3,667,494; Haase; 6-6-72
U.S. Pat. No. 2,911,787; Barry; 11-10-59
U.S. Pat. No. 3,889,536; Sylvester; 6-17-75

Attention is particularly directed to the Sylvester patent, U.S. Pat. No. 3,889,536 issued June 17, 1975 and assigned to the assignee of the present invention. A flow measuring and monitoring apparatus is shown therein having a Venturi tube positioned in a duct, the Venturi tube containing a first pressure sensing tap and a second pressure sensing tap being located in the duct but remote from the first pressure sensing tap. A means for comparing the pressures at the two taps yields a measurement of the pressure and/or velocity of fluid flowing through the duct. To amplify the pressure differential sensed by the two taps, an obstruction is provided in the passage adjacent the Venturi tube. It is further desirable, however, that the pressure and velocity of fluid flowing through the duct be measured across the entire duct rather than at localized points in the duct to permit more accurate and consistent control of fluid regulating apparatus.

SUMMARY OF THE INVENTION

Accordingly, the present invention further provides a fluid flow sensor for use with a fluid flow duct and having a unique facility to average the pressure and velocity of the fluid in the duct across the entire width of the duct.

The invention includes in combination, means defining a main flow passage, and a pair of elongated members, each located in the flow passage and having an elongated chamber therein, and each having a longitudinal axis extending transversely to the direction of fluid flow through the main flow passage. The elongated members define an elongated restricted flow passage therebetween extending transversely to the direction of fluid flow through the main flow passage and characterized by upstream and downstream portions spaced in the direction of fluid flow and exposed directly to the interior of the main flow passage. The elongated restricted flow passage includes a reduced area throat between the upstream and downstream ends and an enlarged flared portion adjacent the downstream end. A plurality of first pressure sensing taps are spaced apart along the length of the restricted flow passage and adjacent the reduced area throat so that the pressure sensed at the taps corresponds to the pressure condition in the throat area. The first pressure sensing taps communicate with one of the elongated chambers in one of the members so that the pressure sensed in that one elongated chamber corresponds to the average pressure sensed by the first pressure sensing taps. A plurality of second longitudinally spaced pressure sensing taps are also provided, the second pressure sensing taps being spaced from the restricted flow passage such that the pressure sensed by the second taps corresponds to the total pressure condition in the main flow passage. The second pressure sensing taps each communicate with the elongated passage in the other of the elongated members so that the pressure sensed therein corresponds to the average pressure sensed by the second pressure sensing taps.

One of the principal features of the invention is the provision in at least one of the elongated members of a planar forward edge transverse to the direction of fluid flow in the main flow passage, and the second plurality of pressure sensing taps comprising a plurality of small apertures in the planar forward edge in communication with the elongated chamber in that member.

Another of the principal features of the invention is the provision of the first pressure sensing taps comprising a plurality of linearly aligned small holes along the length of one of the elongated members and providing fluid communication between the elongated chamber of that elongated member and the throat area of the restricted flow passage formed between the elongated members.

Other features and advantages of the embodiment of the invention will become known by reference to the following description, to the appended claims, and to the drawings.

Figure 1:
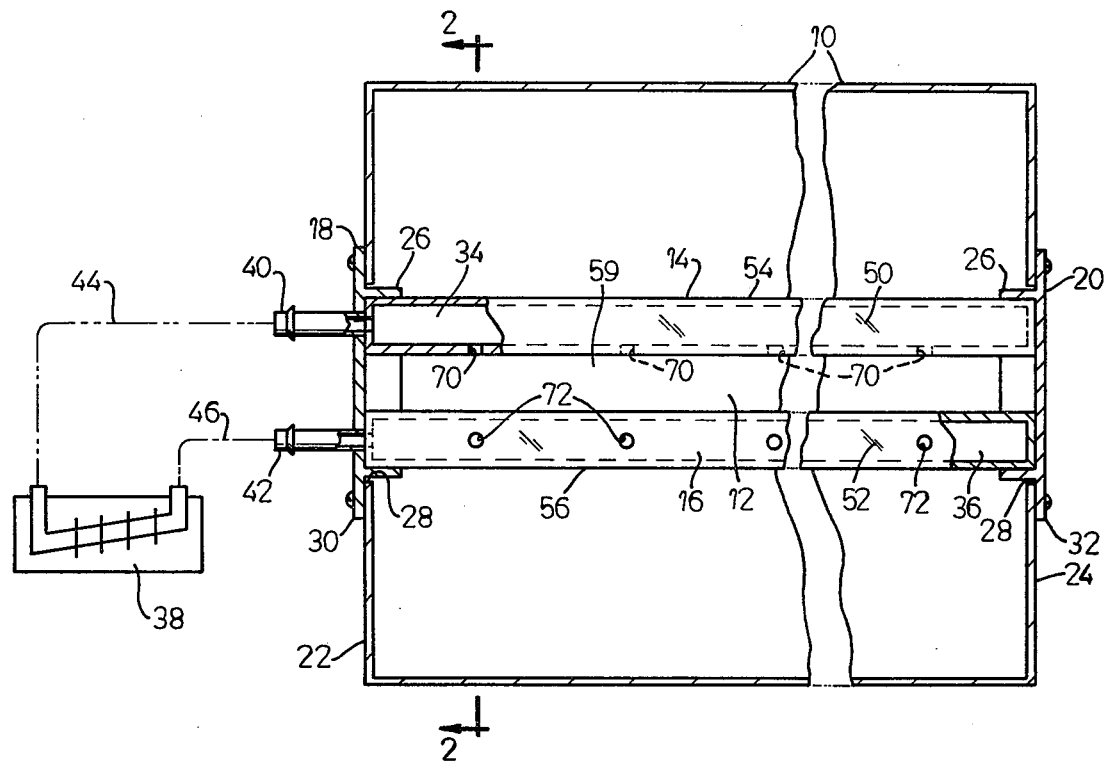
FIG. 1 is a generally schematic illustration of a fluid flow sensor arrangement mounted within an enclosed duct and connected to a pressure gauge.

Before explaining a preferred embodiment of the invention in detail it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Figure 2:
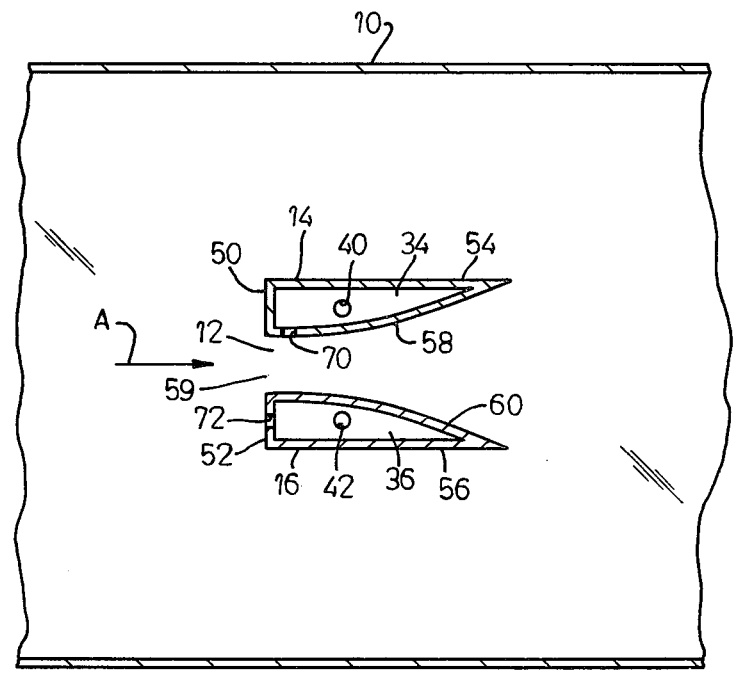
FIG. 2 is a cross section view taken along line 2—2 in FIG. 1.

This invention will now be described with particular reference to the drawings. Before entering into the description, it will be noted that the invention can be used in connection with either a flowing liquid or gaseous medium, but for convenience, it will be described as though incorporated in an air circulating system wherein it would be monitoring the flow of air in the system duct work. A section of an air distribution duct 10 is shown in FIGS. 1 and 2. In a conventional air distribution system, means are provided for influencing a flow of air through the duct 10 in the direction of arrow A in FIG. 2. Since the details of the air moving system are not necessary to an understanding of this invention, they will not be shown or described.

A restricted flow passage 12 is provided in duct 10 and through which a portion of the air flowing in the duct 10 must pass. As illustrated, the flow passage 12 is formed by a pair of parallel spaced elongated hollow members or tubes 14 and 16 positioned across the flow duct 10 and perpendicular to the direction of air flow A. The flow passage 12 is elongated and extends across nearly the entire width of the duct 10.

Means for supporting the opposite ends of the elongated tubes 14 and 16 are provided by a pair of end caps 18 and 20. The end caps 18 and 20 are supported by the side walls 22 and 24 of the duct 10. The end caps 18 and 20 each include a body portion 26 which extends through openings 28 in the side walls 22 and 24, respectively, into the duct 10. The body portions 26 include means for supporting the ends of the elongated members 14 and 16 in spaced apart relationship. The end cap 18 also includes a flange 30 surrounding the body portion 26 and secured against the side wall 22 of the duct 10. The end cap 20 similarly includes a peripheral flange 32 secured against the side wall 24 of the duct 10.

The elongated tubes 14 and 16 are each hollow and include elongated central chambers 34 and 36, respectively, therein. The elongated chambers 34 and 36 are connected to a pressure sensing gauge 38 by means of tube connections 40 and 42, respectively, and conduits 44 and 46. As illustrated in FIG. 1, the pressure gauge 38 may comprise a water gauge. It will be appreciated, however, that any other conventional pressure-type gauge may be utilized.

Referring to FIG. 2, the spaced apart elongated tubes 14 and 16 include planar forward surfaces 50 and 52, respectively, perpendicular to the direction of fluid flow through the duct 10. The upper tube 14 further includes an upper planar surface 54 extending rearwardly from the upper edge of the planar forward surface 50 and parallel to the direction of fluid flow A. The upper tube 14 also includes a curved convex lower surface 58 extending rearwardly from the lower edge of the forward planar surface 50 and having a rearward portion converging with the rearward portion of the upper planar surface 54. The lower tube 16 includes a planar lower surface 56 extending rearwardly from the lower edge of the planar forward surface 52 and also parallel to the direction of fluid flow A. The lower tube 16 also includes a convex upper surface 60 extending rearwardly from the upper edge of the forward planar surface 52 and having a rearward portion converging with the rearward portion of the lower planar surface 56. The mutually opposed convex surfaces 58 and 60 of the elongated tubes 14 and 16 form an elongated narrow throat area 59 between their forward edges and are each curved and diverge outwardly from their forward edges toward their rearward edges such that the width of the opening therebetween increases toward the rearward edges of the elongated members 14 and 16 such that the rearward portion of flow passage 12 has a diverging leaving portion.

The upper elongated tube 14 is provided with a plurality of small linearly aligned apertures or holes 70 in its lower curved wall 58, adjacent the forward edge thereof, to provide first pressure sensing taps providing fluid communication between the throat area 59 of the opening and the elongated chamber 34 formed within the elongated tube 14. The apertures 70 are spaced along the entire length of the elongated tube 14.

The apertures 70 function to expose the air in the elongated chamber 34 of the elongated tube 14 to the low pressure area at the narrow forward portion of the restricted flow passage 12 caused by the vena contracta created adjacent the square edged entering section formed by the lower curved wall 58 and the front planar face 50 of the elongated tube 14 and by the square edged entering section formed between the upper curved wall 60 and the planar front face 52 of the elongated tube 16. The fluid pressure in this area is equal to the static pressure minus two times the fluid velocity pressure. Since the holes or apertures 70 are relatively small, the pressure within the chamber 34 of the elongated tube 14 will be the average of the pressure sensed by each of the linearly aligned pressure sensing taps 70 along the entire length of the elongated tube 14.

The lower elongated tube 16 is similarly provided with a plurality of linearly aligned spaced apart small holes 72 in its forward planar face 52 to provide fluid communication with the elongated chamber 36 therein. The forward edges 50 and 52 of the elongated tubes 14 and 16 function to provide an obstruction in the flow path of duct 10. Accordingly, as described in U.S. Pat. No. 3,889,536, the pressure sensed in the taps 72 will be the sum of the static pressure in the duct 10 plus the velocity pressure of the air flowing through the duct. Since the holes 72, like holes 70, are relatively small, the pressure within the chamber 36 of elongated tube 16 will be the average of the pressure sensed by each of the linearly aligned taps 72 along the entire length of the elongated tube 16.

The apparatus of the invention thus provides a comparison of a static pressure minus two times the velocity pressure as measured by the apertures 70 within the throat area 59 of opening 12 between the elongated members 14 and 16, and the total pressure in the duct 10, which is the sum of the static pressure and the velocity pressure, measured by the holes 72 in the elongated tube 16. Since the chambers 34 and 36 are connected to the gauge 38, the gauge will give a visual readout based on the difference in pressure in the throat area and in the duct 10. This pressure reading can then be used to determine the volume of air flowing through the duct.

Various of the features of the invention are set forth in the following claims.

I claim:

1. A fluid flow measuring apparatus for use in measuring fluid flow through a fluid flow passage, said apparatus comprising: a pair of elongated members each located in said fluid flow passage and each having a longitudinal axis extending transversely to the direction of fluid flow through said fluid flow passage, said members each having a planar forward surface facing said direction of fluid flow, said members defining an elongated restricted flow passage therebetween, said restricted passage characterized by upstream and downstream portions spaced in the direction of fluid flow and including a reduced area throat immediately adjacent said planar forward surfaces and an enlarged flared portion at said downstream end, each of said members having an elongated chamber therein, means defining a plurality of first pressure sensing taps spaced apart along the length of one of said elongated members and providing fluid communication between said reduce area throat and said elongated chamber of said one of said elongated members, and means defining a plurality of pressure sensing taps spaced along said planar forward surfaces of the other of said elongated members and providing fluid communication between said fluid flow passage and said elongated chamber of the other of said elongated members.

2. The combination set forth in claim 1 wherein said second plurality of pressure sensing taps are positioned in linear alignment along said planar forward surface of the other of the elongated members.

3. The combination of claim 1 and further including output means operable in response to pressure differential, and conduits connecting said elongated passages to said output means so that said output means operates in response to the pressure differential sensed by said first and second taps as a medium flows through said main flow passage.

4. The combination as set forth in claim 1 wherein said first pressure sensing taps include a plurality of spaced small holes linearly aligned along the length of said one of said elongated members, each of said small holes extending through a wall of said one of said members to provide fluid communication between said reduced area throat and said elongated chamber of said one of said elongated members.

5. The combination as set forth in claim 1 wherein said elongated members each include a curved wall, said curved walls positioned in spaced opposed relation and each including a forward portion, said forward portions forming said throat area, and said curved walls tapering outwardly and rearwardly from said forward portion toward said downstream end.

6. A combination including means defining a main flow passage, a pair of elongated members each located in said flow passage and each having a longitudinal axis extending transversely to the direction of fluid flow through said main flow passage, said members defining an elongated restricted flow passage therebetween and extending transversely to the direction of fluid flow, said restricted passage characterized by upstream and downstream portions spaced in the direction of fluid flow and exposed directly to the interior of said main flow passage, a reduced area throat between said upstream and downstream ends, and an enlarged flared portion at said downstream end, each of said members having an elongated chamber therein, said elongated members being positioned in closely spaced adjacent parallel relation, and each of said elongated members including a generally planar forward surface, a generally planar surface extending rearwardly from one edge of said planar forward surface and having a rearward edge, and a convex curved surface extending rearwardly from another edge of said planar forward surface, said curved surface having a rearward portion intersecting said rearward edge of said rearwardly extending planar surface, means defining a plurality of first pressure sensing taps spaced apart along the length of said restricted flow passage and adjacent said reduced area throat so that the pressure sensed at said taps corresponds to the pressure condition at said throat area, said first pressure sensing taps communicating with one of the elongated passages in one of said members so that the pressure sensed in said one of the elongated passages corresponds to the average pressure sensed by said first pressure sensing taps, means defining a plurality of second longitudinally spaced pressure sensing taps spaced from said restricted flow passage so that the pressure sensed by said second taps corresponds to the total pressure condition in said main flow passage, said second pressure sensing taps each communicating with the elongated passage in the other of said members so that the pressure sensed in said elongated passage in the other of said members corresponds to the average pressure sensed by the said second taps.

* * * * *